United States Patent
Attfield et al.

(10) Patent No.: US 11,847,237 B1
(45) Date of Patent: Dec. 19, 2023

(54) SECURE DATA PROTECTION AND ENCRYPTION TECHNIQUES FOR COMPUTING DEVICES AND INFORMATION STORAGE

(71) Applicant: Sequitur Labs, Inc., Issaquah, WA (US)

(72) Inventors: Philip Attfield, Fall City, WA (US); Michael Doyle, Las Vegas, NV (US); Vincent Ting, Vancouver (CA)

(73) Assignee: Sequitur Labs, Inc., Fall City, WA (US)

( * ) Notice: Subject to any disclaimer, the term of this patent is extended or adjusted under 35 U.S.C. 154(b) by 112 days.

(21) Appl. No.: 17/386,336

(22) Filed: Jul. 27, 2021

Related U.S. Application Data (63) Continuation-in-part of application No. 15/568,407, filed as application No. PCT/US2016/029144 on Apr. 25, 2016, now abandoned.
(Continued)

(51) Int. Cl.
*G06F 21/60* (2013.01)
*H04L 9/08* (2006.01)
*H04L 9/32* (2006.01)

(52) U.S. Cl.
CPC .......... *G06F 21/606* (2013.01); *G06F 21/602* (2013.01); *H04L 9/0861* (2013.01);
(Continued)

(58) Field of Classification Search
CPC ............... G06F 21/606; G06F 21/602; G06F 2221/2149; H04L 9/0861; H04L 9/0897; H04L 9/3247
See application file for complete search history.

(56) References Cited

U.S. PATENT DOCUMENTS

| | | | |
|---|---|---|---|
| 5,881,225 A | 3/1999 | Vorth | |
| 6,535,607 B1 * | 3/2003 | Chandersekaran | ... H04L 9/0841 |
| | | | 713/168 |

(Continued)

FOREIGN PATENT DOCUMENTS

| | | |
|---|---|---|
| EP | 1339199 | 8/2003 |
| WO | PCT/US06/017123 | 1/2008 |

(Continued)

OTHER PUBLICATIONS

"Computer Architecture: A Quantitative Approach", Hennessy J. and Patterson, D., 5th Ed. Morgan Kaufman (2011).
(Continued)

*Primary Examiner* — Carl G Colin
*Assistant Examiner* — Hany S. Gadalla
(74) *Attorney, Agent, or Firm* — Knowmad Law (57) ABSTRACT

A system for secure data protection and encryption for computing devices. The present invention includes a fast encryption technique for quickly ensuring that the correct binding parameters are used for an encrypted data file. The encrypted file is used in two ways. Because unsecure data could pass through a peripheral device to gain access to a secure computing environment, a dongle housing encryption and decryption subsystems is placed in between the unsecure sources and the peripheral that can encrypt and decrypt data intended for the secure computing environment. The firmware of the computing device can be updated by dividing the update file into encrypted segments that are verified on the device and placed into non-volatile memory. When all parts have been received, decrypted, and written into memory, the device reboots using the updated firmware.

12 Claims, 10 Drawing Sheets

Related U.S. Application Data (60) Provisional application No. 62/153,671, filed on Apr. 28, 2015.

(52) U.S. Cl.
CPC .......... *H04L 9/0897* (2013.01); *H04L 9/3247* (2013.01); *G06F 2221/2149* (2013.01)

(56) References Cited

U.S. PATENT DOCUMENTS

| | | |
|---|---|---|
| 7,140,035 B1 | 11/2006 | Karch |
| 7,240,015 B1 | 6/2007 | Karmouch |
| 7,246,233 B2 | 7/2007 | Brabson et al. |
| 7,400,891 B2 | 7/2008 | Aaron |
| 7,640,429 B2 | 12/2009 | Huang et al. |
| 7,797,544 B2 | 9/2010 | Dillaway |
| 7,941,647 B2 | 5/2011 | Yates |
| 8,014,721 B2 | 9/2011 | Johnson |
| 8,037,318 B2 | 10/2011 | Tahan |
| 8,127,982 B1 | 3/2012 | Casey et al. |
| 8,135,385 B2 | 3/2012 | Ohta |
| 8,176,336 B1 | 5/2012 | Mao |
| 8,185,959 B2 | 5/2012 | Bellwood |
| 8,230,399 B2 | 7/2012 | Vertes |
| 8,285,249 B2 | 10/2012 | Baker et al. |
| 8,321,498 B2 | 11/2012 | Maes |
| 8,463,819 B2 | 6/2013 | Shashikumar et al. |
| 8,468,586 B2 | 6/2013 | Kootayi et al. |
| 8,468,608 B1 | 6/2013 | Hernacki |
| 8,538,843 B2 | 9/2013 | Smith |
| 8,922,372 B2 | 1/2014 | Soffer |
| 8,688,592 B1 | 4/2014 | Abramson |
| 8,880,047 B2 | 11/2014 | Konicek |
| 8,904,483 B1 | 12/2014 | Martini |
| 9,053,456 B2 | 6/2015 | Verthein |
| 9,391,782 B1 | 7/2016 | Mironenko |
| 9,411,962 B2 | 8/2016 | Attfield |
| 9,537,657 B1 * | 1/2017 | Char ............... H04L 9/0637 |
| 10,503,713 B1 * | 12/2019 | Gattu ............... G06F 16/125 |
| 2002/0101826 A1 | 8/2002 | Giacopelli |
| 2002/0138814 A1 | 9/2002 | Katayama |
| 2003/0125925 A1 | 7/2003 | Walther |
| 2004/0123139 A1 | 6/2004 | Aiello |
| 2004/0123153 A1 | 6/2004 | Wright |
| 2004/0204949 A1 | 10/2004 | Shaji |
| 2005/0132202 A1 | 6/2005 | Billaway |
| 2005/0177713 A1 * | 8/2005 | Sim ............... H04L 63/0442 713/151 |
| 2005/0193196 A1 | 9/2005 | Huang |
| 2006/0005239 A1 | 1/2006 | Mondri |
| 2006/0026548 A1 | 2/2006 | Rosener |
| 2006/0059565 A1 | 3/2006 | Green |
| 2006/0150256 A1 | 7/2006 | Fanton |
| 2006/0236369 A1 | 10/2006 | Covington |
| 2006/0236385 A1 | 10/2006 | Innes |
| 2006/0265595 A1 * | 11/2006 | Scottodiluzio ........ H04L 9/3247 713/180 |
| 2007/0033320 A1 * | 2/2007 | Wu ............... G06F 21/74 711/100 |
| 2007/0150559 A1 | 6/2007 | Smith |
| 2008/0085698 A1 | 4/2008 | Gamm |
| 2008/0133914 A1 | 6/2008 | Isaacson |
| 2008/0184336 A1 | 7/2008 | Sarukkai |
| 2008/0194233 A1 | 8/2008 | Henry |
| 2008/0256363 A1 * | 10/2008 | Balacheff ............. G06F 21/572 713/187 |
| 2009/0031141 A1 | 1/2009 | Pearson |
| 2009/0089125 A1 | 4/2009 | Sultan |
| 2009/0100269 A1 | 4/2009 | Naccache |
| 2009/0193503 A1 | 7/2009 | Shevohenko |
| 2009/0198617 A1 | 8/2009 | Soghoian |
| 2009/0204785 A1 | 8/2009 | Yates, Jr. et al. |
| 2009/0205016 A1 | 8/2009 | Milas |
| 2009/0300174 A1 | 12/2009 | Floris |
| 2010/0023454 A1 | 1/2010 | Exton |
| 2010/0023703 A1 | 1/2010 | Christie |
| 2010/0037311 A1 | 2/2010 | He |
| 2010/0199325 A1 | 8/2010 | Raleigh |
| 2010/0216429 A1 | 8/2010 | Mahajan |
| 2010/0250370 A1 | 9/2010 | Jones et al. |
| 2011/0055890 A1 | 3/2011 | Gaulin |
| 2011/0063098 A1 | 3/2011 | Fischer |
| 2011/0077758 A1 | 3/2011 | Tran |
| 2011/0154034 A1 | 6/2011 | Bailey, Jr. |
| 2011/0173108 A1 | 7/2011 | Rjasekar |
| 2011/0173122 A1 | 7/2011 | Singhal |
| 2011/0251958 A1 | 10/2011 | Aubin |
| 2011/0258692 A1 | 10/2011 | Morrison |
| 2011/0264922 A1 * | 10/2011 | Beaumont .......... H04N 21/4181 713/189 |
| 2011/0270751 A1 | 11/2011 | Csinger |
| 2012/0030731 A1 | 2/2012 | Bhargava |
| 2012/0129450 A1 | 5/2012 | Lee |
| 2012/0197743 A1 | 8/2012 | Grigg |
| 2012/0214516 A1 | 8/2012 | Rosenberg |
| 2012/0216012 A1 | 8/2012 | Vorbach et al. |
| 2012/0270523 A1 | 10/2012 | Laudermilch |
| 2012/0323596 A1 | 12/2012 | Verhulst |
| 2012/0323717 A1 | 12/2012 | Kirsch |
| 2013/0029653 A1 | 1/2013 | Baker et al. |
| 2013/0080411 A1 | 3/2013 | Rolia |
| 2013/0125099 A1 | 5/2013 | Budiu |
| 2013/0130650 A1 | 5/2013 | Cheung |
| 2013/0138955 A1 * | 5/2013 | Darcy ............... G06F 21/6218 713/165 |
| 2013/0145429 A1 | 6/2013 | Mendel |
| 2013/0212022 A1 | 8/2013 | Lanc |
| 2013/0253942 A1 | 9/2013 | Liu et al. |
| 2013/0275746 A1 | 10/2013 | Galdwin |
| 2013/0298664 A1 | 11/2013 | Gillette, II |
| 2014/0007193 A1 | 1/2014 | Qureshi |
| 2014/0013112 A1 | 1/2014 | Cidon |
| 2014/0019497 A1 * | 1/2014 | Cidon ............... G06F 16/182 707/827 |
| 2014/0096186 A1 | 4/2014 | Barton |
| 2014/0115659 A1 | 4/2014 | Attfield et al. |
| 2014/0143089 A1 | 5/2014 | Campos |
| 2014/0173700 A1 | 6/2014 | Awan |
| 2014/0195425 A1 | 7/2014 | Campos |
| 2014/0279474 A1 | 9/2014 | Evan |
| 2014/0379361 A1 | 12/2014 | Mahakar |
| 2015/0227925 A1 | 8/2015 | Filler |
| 2015/0278810 A1 | 10/2015 | Ramatchandirane |
| 2015/0302409 A1 | 10/2015 | Malek |
| 2015/0312277 A1 | 10/2015 | Rane et al. |
| 2015/0334133 A1 | 11/2015 | Schaffner et al. |
| 2015/0350254 A1 | 12/2015 | Hendrick et al. |
| 2015/0358822 A1 | 12/2015 | Hendrick et al. |
| 2016/0012216 A1 | 1/2016 | Attfield et al. |
| 2016/0314296 A1 | 10/2016 | Attfield et al. |
| 2017/0048714 A1 | 2/2017 | Attfield et al. |
| 2017/0244759 A1 | 8/2017 | Attfield et al. |
| 2022/0335147 A1 * | 10/2022 | Yedluri ............... G06F 21/31 |

FOREIGN PATENT DOCUMENTS

| | | |
|---|---|---|
| WO | PCT/US08/009313 | 2/2009 |
| WO | WO2015/026389 | 2/2015 |
| WO | PCT/US15/24932 | 4/2015 |
| WO | PCT/US15/27561 | 4/2015 |
| WO | PCT/US14/70897 | 12/2015 |
| WO | PCT/US15/048526 | 3/2016 |
| WO | PCT/US16/28481 | 10/2016 |
| WO | PCT/US16/032502 | 11/2016 |
| WO | PCT/US16/029144 | 2/2017 |

OTHER PUBLICATIONS

"Computer Networks", Tanenbaum, A. Andrew and Wetherall, D., 5th Ed. Prentice Hall (2010).

(56) References Cited

OTHER PUBLICATIONS

"Prolog Programming: A First Course", BRNA, P. (Mar. 5, 2001). Retrieved from <http://homepages.inf.ed.ac.ud/pbrna/prolog book/> on Mar. 16, 2013.

NFC Forum (2007), "Near Field Communication and the NFC Forum: The Keys to Truly Interoperable Communications" (PDF), http://www.nfc-forum.org, retrieved Oct. 30, 2012.

Landt, Jeremy (2001), "Shrouds of Time: The history of RFID", AIM, Inc. pp. 5-7.

Bluetooth Special Interest Group website, "A Look at the Basics of Bluetooth Wireless Technology", http:www.bluetooth.com/Pages/Basics.aspx, retrieved Oct. 29, 2012.

See e.g. H. Schildt, C ++-The Complete Reference, 2nd edition, pp. 67-70 McGraw Hill, 1995, ISBN 0-07-882123-1.

K. Ashton, "That 'Internet of Things' Thing", RFID Journal Jun. 22, 2009 (available online as of Oct. 20, 2013 at http://www.rfidjournal.com/articles/view?4986).

T. White, Hadoop—The Definitive Guide, O'Reilly, 2009 978-0-596-52197-4.

Nakamoto, Satoshi. "Bitcoin: A peer-to-peer electronic cash system." Consulted Jan. 2012 (2008): 28. Obtained from http://www.cryptovest.co.ok/resources/Bitcoin%20paper%20 Original.pdf on Apr. 6, 2015.

Bitcoin, Inc. "What are multi-signature transactions?", Obtained from http://bitcoin.stackexchange.com/questions 3718/what-are-multi-signature-transactions on Apr. 6, 2015.

Verilog, http://www.verilog.comm/, accessed May 12, 2014.

L. Woods, ZS. Istvan, G. Alonzo Ibex(2014) An Intelligent Storage Engine with Support for Advanced SQL Off-loading. VLDB 2014k, Hangzhou, China, Sep. 2014.

University of British Columbia, Department of Electrical and Computer Engineering, http://www.ece.ubc.ca//~edc/379, jan99/lecgureslec 13.pdf, accessed May 2014.

IEEE P 1076 Working Group. http://www.eda.org/twiki/bin/view.cgi/P1076, accessed May 12, 2014.

* cited by examiner

Figure 1: Schematic Representation of System

SECURE DATA PROTECTION AND ENCRYPTION TECHNIQUES FOR COMPUTING DEVICES AND INFORMATION STORAGE

CROSS-REFERENCE TO RELATED APPLICATION

This application is a continuation-in-part application and claims priority benefit of U.S. patent application Ser. No. 15/568,407 filed Oct. 20, 2017; which is a 371 application of PCT/US2016/029144 filed Apr. 25, 2016; which claims benefit of Provisional Patent Application No. 62/153,671 filed Apr. 28, 2015; which is incorporated by reference herein in its entirety.

TECHNICAL FIELD

The present invention relates to the technical fields of Computer Security, Embedded Systems, Encryption, Mobile Computing, Telecommunications, Digital Communications, and Computer Technology.

BACKGROUND OF THE INVENTION

Recent years have brought the emergence and rapid proliferation of mobile computing devices such as mobile telephones or "handsets" with extensive computing, communication, and input and interaction capabilities ("smart phones") plus a growing array of other mobile computing devices such as touchscreen tablets, "netbooks", electronic document readers, and laptops in a wide range of sizes and with wireless and wired communication capabilities.

This proliferation of mobile devices has been accompanied by complementary advances in development and adoption of long range wireless broadband technologies such as 3G and 4G, as well as commonplace deployment of shorter range wireless technologies such as the 802.11 series of wireless standards and "Bluetooth" short range wireless, all with considerable bandwidth. These technologies span multiple radio frequency bands and protocols.

Alongside the radio transceivers for such communications capabilities, many of these mobile devices also contain an array of onboard sensors such as cameras, microphones, and GPS receivers plus other locating technologies, as well as considerable fixed-onboard and removable memory for information and multimedia storage.

Furthermore, smartphones and similar devices are typically capable of running a wide variety of software applications such as browsers, e-mail clients, media players, and other applications, which in some cases may be installed by the user. Mobile devices are now fully capable computing environments that require security to the same extent as any other computing environment would.

Along with the profusion of smartphones and other mobile, wireless-capable devices, there has also been a dramatic increase in the use of social networks and related technologies for information sharing for consumer as well as for professional uses. Access to social networks on mobile devices has heightened concerns about individual, government, and corporate information security, and about possibilities for privacy violations and other unintended and undesirable information sharing. Furthermore, the possible professional and personal use of any given handset presents a complex set of usage contexts under which rules for device capability usage and information access need be considered.

Such sophisticated and capable smartphones and similar devices, along with the vast amounts of information that they can contain and access, present a large set of potential security vulnerabilities (a large "attack surface") that might allow information to be accessed by malicious parties or allow undesirable use and exploitation of the device capabilities for malicious purposes such as "phishing" fraud, other online fraud, or inclusion in botnets for spam transmission, denial-of-service attacks, malicious code distribution, and other undesirable activities.

Furthermore, compared with conventional desktop personal computers, smartphone handsets by nature are portable and thus more easily stolen. Portability also means that the devices will encounter security contexts that cannot be foreseen, and which may never occur again. The mobile threat landscape is complex and presents a vast set of extant and emergent security concerns.

There is, therefore, a growing need to improve upon not only the degree of protection provided by components and systems that enhance the security of mobile devices, but also to improve on the efficiency and security of such security-related components and systems themselves, so that both they and the devices and the information that they protect are more robust and are better able to withstand attempts to thwart or otherwise compromise them.

BRIEF SUMMARY OF THE INVENTION

Because modern mobile systems must connect to external (peripheral) devices and they must also be able to update their firmware and other executable programs in a secure manner, the present invention is an efficient system and method to encrypt files for transmission, and then either pass them securely through peripheral devices or directly to the firmware memory for updating. There are three key steps presented. The encryption is made more efficient by appending a small data segment to the end of the encrypted file to ensure that the binding parameters being used are correct. Peripherals are connected to the system via a dongle for encrypting or decrypting files that pass through the peripheral device that sits between the secure and normal operating environments. Finally, the invention proposes a system and method to securely update firmware or other executable programs to secure memory by segmenting the update file into signed and encrypted parts that are transmitted separately. They are then received, decrypted, and written to a secure memory location. When complete the system reboots (restarts) with the new updated firmware or executable program.

The invention has a number of advantages. The encryption method is more efficient than conventional methods because it is able to ensure that the best binding parameters are used. The dongle then uses the encryption technique to ensure that the inherent vulnerability of unsecure data reaching the secure world via peripheral devices is closed. All data is now encrypted. Lastly, the encryption technique is applied to each data segment of the firmware update or executable program to be written to ensure that the data that reaches the secure memory location is verified.

DETAILED DESCRIPTION OF THE INVENTION

The present invention consists of a set of capabilities and techniques for enhancing the security and privacy of information storage on computing devices, and for performing secure updates to network-connected computing devices.

Encryption Techniques for Secure Binding and Fast Decryption Processing

Security of encryption of digital data for mobile devices can be enhanced by binding the encryption key to one or more specific digital objects, such that it is difficult or impossible to decrypt the data without the presence of, and access to, those objects. As a non-limiting example, such binding may be performed through the use of some complex computation with inputs that include each of the digital objects to be bound to, and with one of the outputs being the encryption key. In the following list, a set of such objects is presented which may be used in some combination to perform such secure binding:

Program or module binding.
Program version or module version binding.
Developer certificate binding
Device binding. In the case of device binding, the computed key is based on a parameter or on parameters unique to the device, such as the International Mobile Station Equipment Identity (IMEI), such that the encrypted file can only be decrypted on the same device.
Custom: allows the use of a custom parameter as an input to which to bind the key.
Password: allows the use of a password as an input to which to bind the key.

The set of objects used for binding can be a combination of these listed objects, as selected prior to or during binding.

Figure 1:
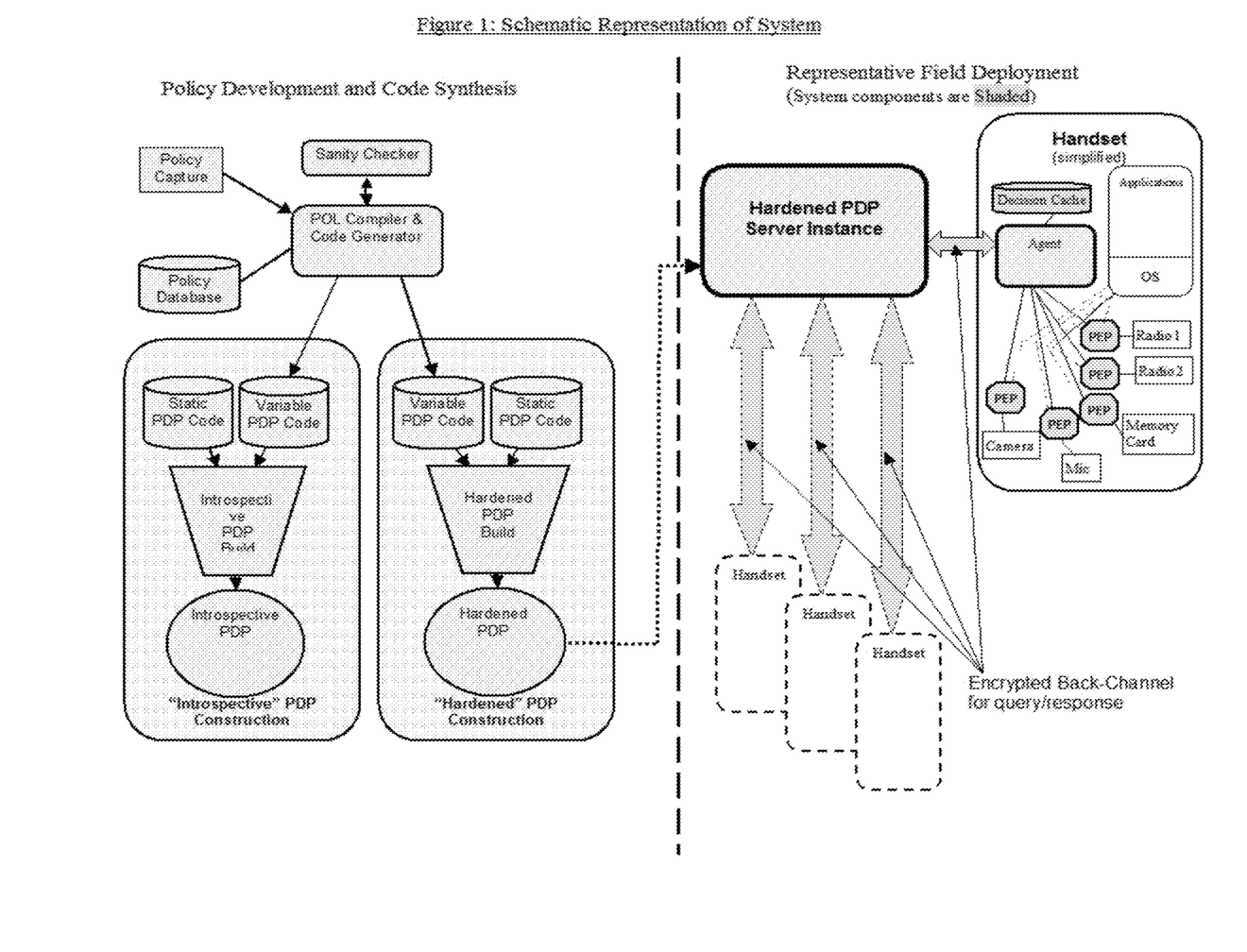
FIG. 1. Schematic representation of system.
Figure 2:
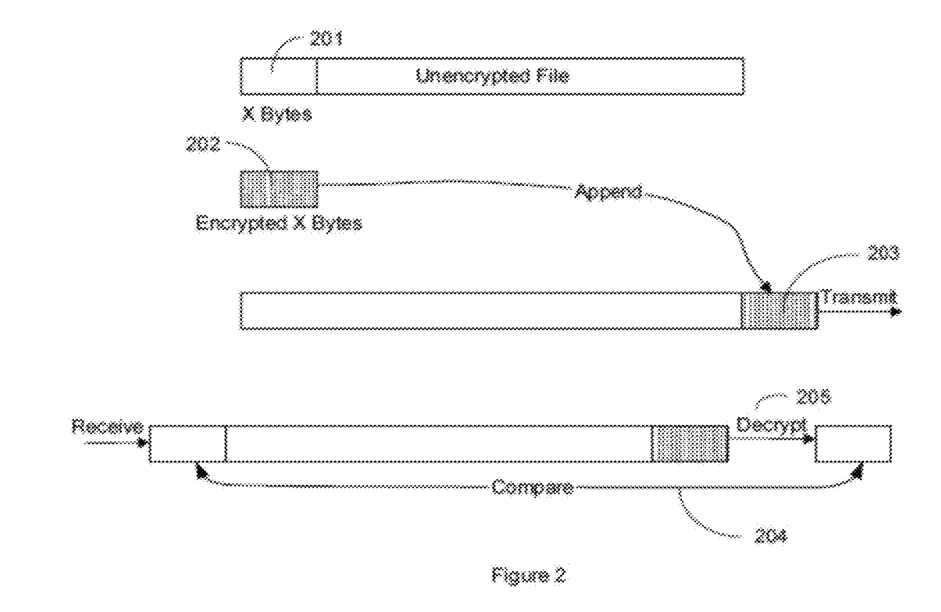
FIG. 2. The process of fast encryption and decryption for secure binding.

Among the drawbacks to encryption, and particularly to public key encryption over symmetric encryption, are the computational time and computational expense required for decryption of the encrypted data (FIG. 2). Furthermore, in some cases, it may not be known with certainty that the binding parameters about to be used for decryption are the correct ones. Steps can be taken during encryption to allow for faster processing when the file is later decrypted. As one such step, a small segment of a certain initial segment of the unencrypted file (201) is copied, pre-processed and encrypted (202), then finally appended to the end of the encrypted file (203). That segment, rather than the whole file, can then be examined post-encryption to determine whether the binding parameters to be used in decryption are the correct ones (204).

As a specific, non-limiting example, during the encryption process, the Secure Hash Algorithm SHA256 is applied to a copy of the first X bytes (201) of the unencrypted file and the encrypted copy is appended to the whole file, encrypted (202), to the end of the encrypted file (203). After this procedure, post-encryption, unencrypt and extract the appended SHA256 component (205) and compare it with the first X bytes (204), and verify that they match, as a fast test that the binding parameters being used in the decryption are correct.

Methods for Securing Peripherals

One key approach to defending security-related systems, data, and components from malicious attack is to have them reside within especially secure areas, partitions, or environments on device hardware that are inaccessible to unauthorized parties or for unauthorized purposes, with this "secure world" separated from the main device operating system and, in some cases, from certain of its insecure resources, with these insecure components comprising the "normal world". A further degree of security can be provided if the secure partitions or areas are also invisible and undetectable to the greatest degrees possible, under unauthorized circumstances and by unauthorized parties.

However, even with the use of such secure areas and other measures internal to the computer, due to a need for interaction and input with computer users in many cases, weak points for security of entire systems remain, such as the input and output devices themselves, and their connections and interfaces with other system components and with operating system software and applications. Malicious use of software for intercepting keyboard entries, or "key logging", is common, as is "phishing" software for unwanted interception of entered data, and this represents a considerable threat that can reveal passwords and other sensitive data to parties not intended to see it.

In the present invention (FIG. 3), the following means provide for more secure coupling of input and output devices to secure system components and applications on a host computer. Here, secure transmission of data to or from a peripheral device is provided through a "normal" or untrusted partition or channel, from or to a secure partition or secure area on the host, and with the data securely protected during its passage (301). Non-limiting examples of such peripherals include keyboards, keypads, trackpads, touchscreens, mice, camera, biometric sensors, active display devices such as LCD displays and monitors, printers, and plotters. In order to do this, a hardware device hereinafter referred to as "dongle", containing certain required components is inserted or installed between the peripheral and the host (302).

Figure 3:
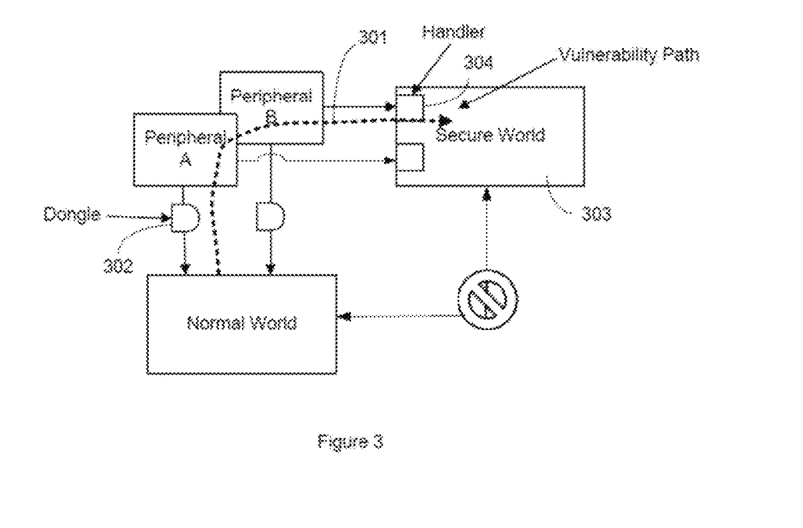
FIG. 3. The system for securing the pathway between the secure and normal world by placing a dongle in between the peripherals and the host.

Connections between peripheral, dongle, and host may be through standard interfaces such as USB, PS/2, or by other means, but in each case with the dongle securely separating peripheral and host. The components include storage for digital encryption key(s) as needed for encryption of data prior to transmission, as well as required hardware for interfacing with the input device and the computer. This allows for data to be encrypted before transmission to the normal world of the host for passage through to the secure world for use in secure or otherwise trusted applications there such as payment applications or healthcare-related applications. Corresponding encryption keys are stored in the secure world (303) for appropriate encryption data as needed for communication with the secured peripherals. Each secured peripheral has a corresponding "handler" module (304) in the secure world for managing communication out into the normal world through to the peripheral.

In some cases, peripheral input and output cannot be communicated directly to a secure world, and in such cases, a normal world application may be required as an intermediary to route traffic from the input device such as a keyboard, to a trusted application for processing, but in such a case the data is already encrypted prior to reaching the intermediary. Similarly, output to a display device could be done using an intermediary normal world application driving a GPU, but with though the normal world to a display being encrypted by an intermediary dongle.

In cases where such secure communication with the peripheral is not required, the dongle is permitted to go into a non-encrypting mode and act as a transparent "pass through" of unencrypted or otherwise unsecured data to a normal world unsecured application, upon receipt of an acceptable signal such as a key sequence or special key code from the user.

Figure 5:
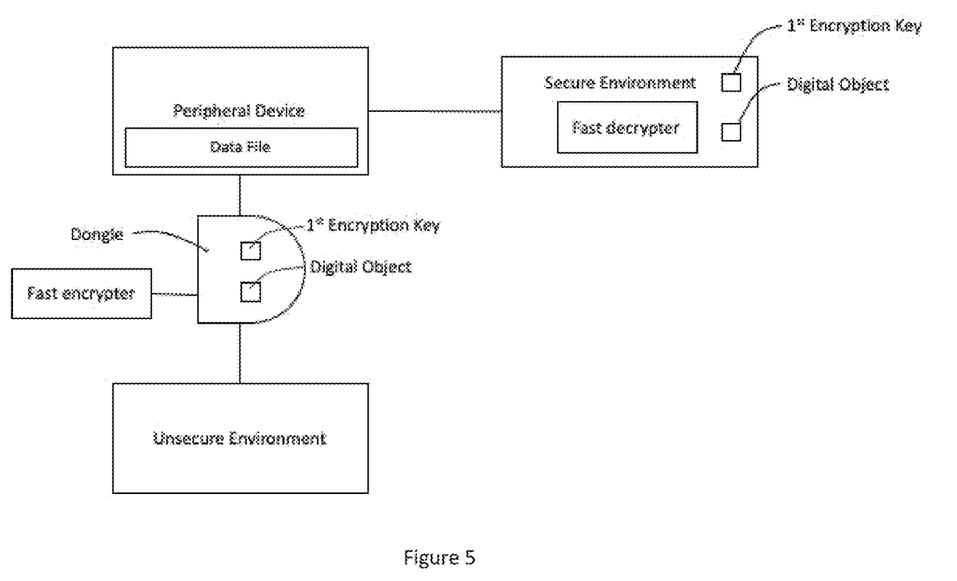
FIG. 5. A schematic showing how a data file on a peripheral device is encrypted with a dongle and transmitted to the secure environment.
Figure 6:
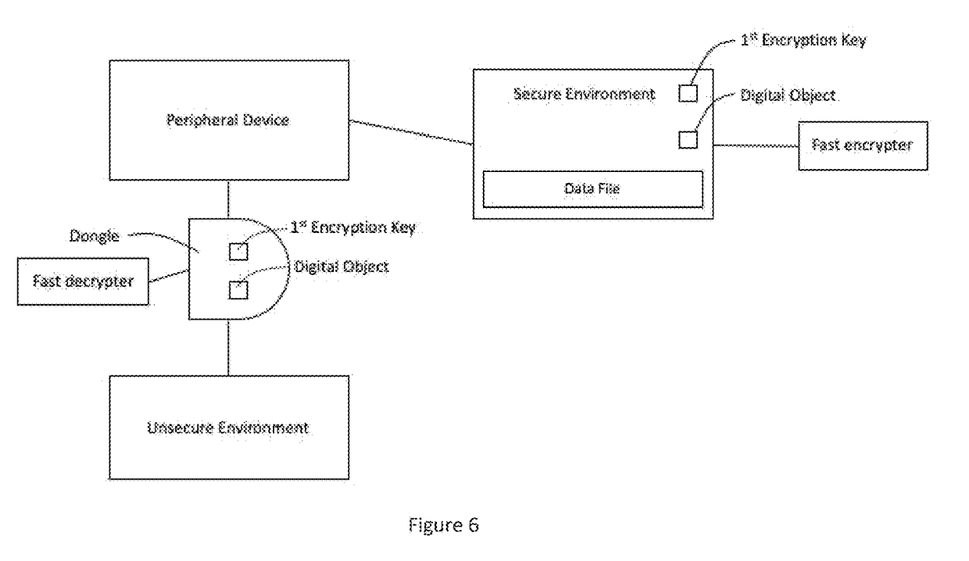
FIG. 6. A schematic showing how a data file in the secure environment is encrypted and transmitted to the peripheral device via a dongle.
Figure 7:
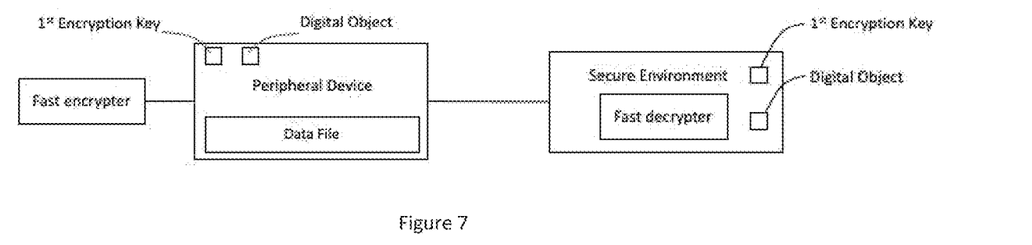
FIG. 7. A schematic showing how a data file on a peripheral device is encrypted and transmitted to the secure environment without a dongle.
Figure 9:
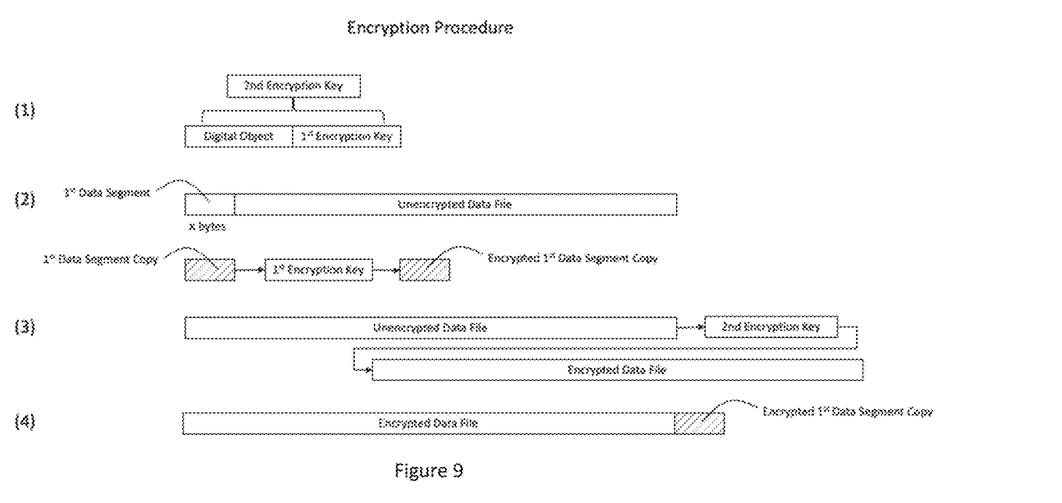
FIG. 9. The procedure for encrypting a data file or update file using a digital object and the creation of a second encryption key.

FIG. 9 shows the procedure for encryption utilized in the present invention. As shown in FIGS. 5-7, both the digital object and the $1^{st}$ encryption key are present both in the secure environment and externally, either on the peripheral device or the dongle if present. The digital object and the $1^{st}$ encryption key are bound to form the $2^{nd}$ encryption key. Then the first segment of the data file to be encrypted is copied and the encrypted using the $1^{st}$ encryption key. The resulting encrypted copy of the first segment is appended to the end of the unencrypted data file which is the encrypted in its entirety using the $2^{nd}$ encryption key. This is the encrypted data file that is transmitted.

Figure 10:
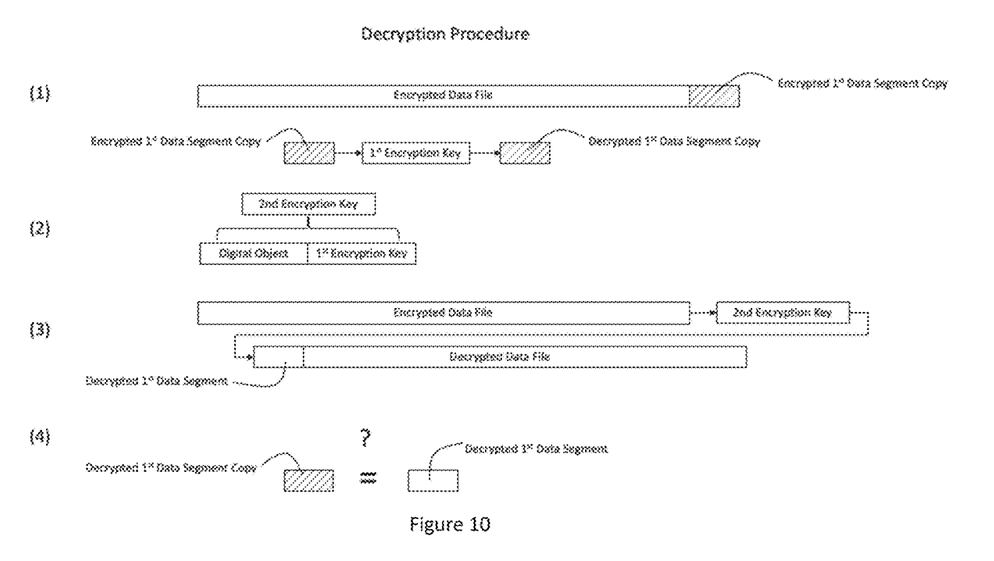
FIG. 10. The procedure for decrypting a data file or update file using a digital object and the creation of a second encryption key.

FIG. 10 then shows the reverse procedure to decrypt the data file. The encrypted data file is received and the appended first data segment copy is detached and decrypted using the $1^{st}$ encryption key. The $2^{nd}$ encryption key is created in the same manner that is used for the encryption procedure because both the $1^{st}$ encryption key and the digital object are present. The second encryption key is then used to decrypt the entire data file. Finally, the decrypted first segment is compared to the decrypted first segment copy to determine if they are a match.

FIG. 5 shows a schematic of the system where a dongle is present, and the data file is on the peripheral device and is transmitted to the secure environment. FIG. 6 shows a schematic of the reverse process where the data file is on the secure environment to be transmitted to the peripheral device. FIG. 7 shows the same system as FIG. 5 but without the use of the dongle for encryption. The encryption occurs on the peripheral itself.

Methods for Secure Device Firmware Updates

Modern computing devices such as smartphones, tablet computers, and also internet-connected devices in the "Internet of Things", typically contain non-volatile memory and persistent memory content collectively known as "firmware" that is stored in the non-volatile memory on the device. Firmware content may include operating system code, "boot loader" code for device initialization and loading the operating system, and other code essential to device operations, plus data and in some cases application software.

Figure 4:
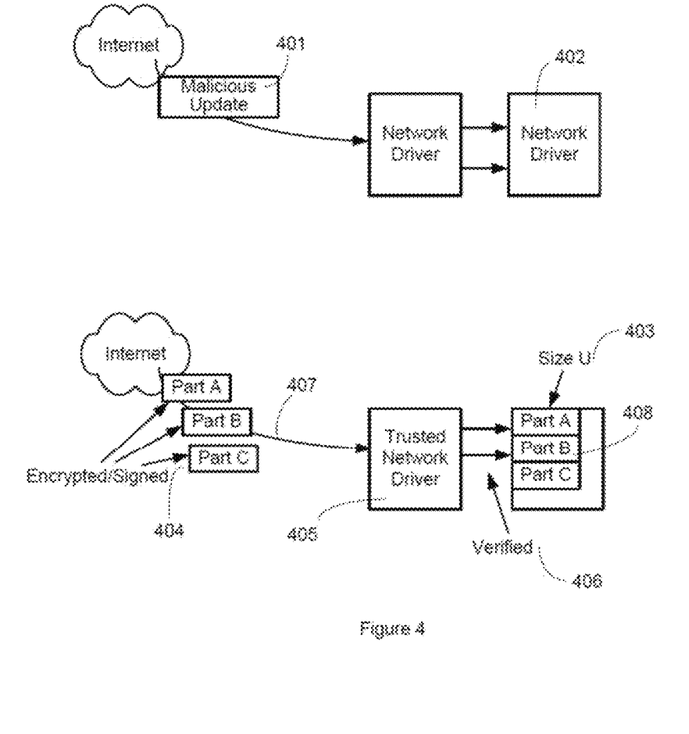
FIG. 4. The process for secure firmware updates by segmenting the update, encrypting, transmitting, decrypting, and writing to a secure memory location.

Inevitably, whether to fix software bugs, patch security vulnerabilities, to update features, or for other reasons, it is desirable to be able to update the firmware content. For reasons such as lower cost, manageability, and ease of update, it can be preferable to update the firmware via the internet or some other network connection, rather than by other means such as hardware replacement or by transfer of the new firmware content from a locally connected storage device. However, such "Over the Air" (OTA) network updates present certain security risks such as possible malicious interception of the in-transit firmware and subsequent injection of malicious code onto the device (401), or other undesired exploits of firmware target content (402). The following methods are presented for securing such firmware updates (FIG. 4).

First, the method requires that at least some amount of size U of non-volatile memory (403) be designated for use for the secure updating process. The new firmware of the update, the net "payload" in this case, is encrypted that can be securely verified on the target device and split into data segments of size U or smaller (404). Each segment is digitally signed. A secure other portion of non-volatile memory such as a locked "boot" portion must contain trusted drivers (405) for network connections such as wired internet or wireless technology such as 802.11 variants or cellular, and/or other network modalities, and that portion or another locked portion should contain certificates or root certificates as required to decrypt received segments of encrypted payload. The means to call cryptographic verification functions should also either reside in or have its driver in the boot sector (406).

Data segments are then transmitted over the network (407) from a secure server or other secure source and received via the trusted network driver (405) and used to update other non-volatile memory areas appropriately. Data segments may be received sequentially and loaded into successive non-volatile memory locations in received order, or in other cases may be loaded in any sequence and may be loaded into assigned non-volatile memory locations designated for individual identified segments; these and other segment transmission possibilities are contemplated within the invention. As each data segment is received, its signature is verified (406), and the data segment is written to the appropriate portion of non-volatile memory (408). The download, verify, install procedure of data segments is repeated until the entire set of segments, comprising the update payload is received. Once entire set of data segments has been installed into memory, the device can boot (restart) with the newly updated firmware. Note that this procedure is not exclusive to firmware updates but can be used to safely write any executable program into secure memory.

Figure 8:
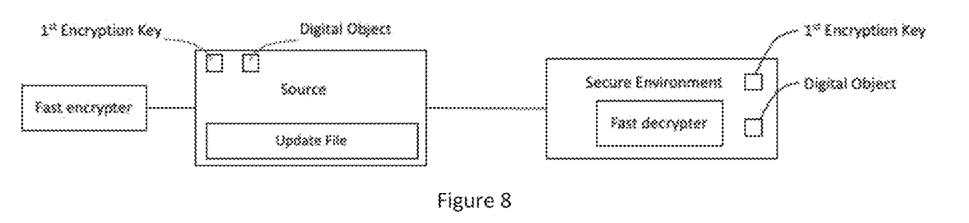
FIG. 8. A schematic showing how an update file on a source device is encrypted and transmitted to the secure environment.

FIG. 8 shows a schematic with a source having an update file that is to be encrypted and transmitted to the secure environment. Note that the dongle configuration shown in FIG. 5 could also be used for this same purpose.

This method has the strengths or advantages as follows:
1) The network driver used for OTA updates is trustworthy regardless of device state. This is important because if the device is in a partially-updated state, then a trustworthy loader is required throughout uploading for confidence of fully secure update and for secure recovery to be possible in case of failed transmission of any chunks or in case of any other update problems.
2) A reliable fallback mechanism exists in that a partially-updated device can still boot with network connectivity because the driver and ability to check payload reside in a trusted area.

INDUSTRIAL APPLICATION

The invention is generally useful to any application where the computing device used may be connected to external peripheral devices and must be updated periodically. Neither the firmware update technique nor the peripheral dongles require the use of the aforementioned encryption technique but some accepted form of encryption must be employed. Any computing device can use these techniques, not only mobile or handheld devices.

What is claimed is:

1. A system for secure data protection on a computing device for secure data transmission from a peripheral device to a secure environment on the computing device, the system comprising:
   the secure environment on the computing device having a secure memory;
   an unsecure environment;
   the peripheral device communicatively coupled to the secure environment;
   a data file residing on the peripheral device, said data file having a front end and a back end;
   a dongle communicatively coupling the peripheral device to the unsecure environment for encrypting the data file from the peripheral device;
   a first encryption key stored in the secure memory on the computing device and on the dongle;
   at least one digital object residing on the dongle and in the secure memory;
   a fast encrypter communicatively coupled to the dongle for encrypting the data file, wherein a second encryption key is created by binding the at least one digital object to the first encryption key, then a first data segment of the data file is copied and encrypted using the first encryption key producing an encrypted first data segment, then the data file is encrypted using the second encryption key, and then the encrypted first data segment is appended to the back end of the encrypted data file;
   a transmitter communicatively coupled to the unsecure environment for transmitting the encrypted data file with the appended encrypted first data segment to the secure environment;
   a fast decryptor residing in the secure environment for decrypting the appended encrypted first data segment using the first encryption key, then recreating the second encryption key by binding the at least one digital object with the first encryption key, and then decrypting the encrypted data file using the second encryption key; and
   a hardware processor performing steps comparing the decrypted appended first data segment to the decrypted first data segment of the data file, and for reporting when said data segments do not match.

2. The system of claim 1, wherein the fast encrypter further segments the data file into segments before encryption and each segment is encrypted separately.

3. A system for secure data protection and updating on a computing device, the system comprising:
   a secure environment on the computing device having a secure memory;
   a source having a local memory for storing a firmware update, said firmware update having a front end and a back end;
   at least one digital object residing in the local memory of the source and in the secure memory;
   a first encryption key stored in the secure memory on the computing device and in the local memory of the source;
   a fast encrypter communicatively coupled to the source for encrypting the firmware update, wherein a second encryption key is created by binding the at least one digital object to the first encryption key, then a first data segment of the firmware update is copied and encrypted using the first encryption key producing an encrypted first data segment, then the firmware update is encrypted using the second encryption key, and then the encrypted first data segment is appended to the back end of the firmware update;
   a transmitter coupled to the fast encrypter for transmitting the encrypted firmware update with the appended encrypted first data segment to the secure environment;
   a fast decryptor communicatively coupled to the secure environment for decrypting the appended encrypted first data segment using the first encryption key, then recreating the second encryption key by binding the at least one digital object with the first encryption key, and then decrypting the encrypted firmware update using the second encryption key;
   a hardware processor performing steps comparing the decrypted appended first data segment to the decrypted first data segment of the firmware update;
   a secure installer coupled to the comparator for securely updating software executable programs on the computing device by restarting the software executable program within the secure memory with the firmware update when the decrypted appended first data segment matches the decrypted first data segment of the data file.

4. The system of claim 3, wherein the fast encrypter further segments the firmware update into segments before encryption and each segment is encrypted separately.

5. The system of claim 2 or 4, wherein the fast encrypter digitally signs each of the encrypted segments.

6. A method for secure data protection on a computing device whereby a data file from a peripheral device having a dongle is transmitted from an unsecure environment to a secure environment having a secure memory, comprising the steps of:
   storing a first encryption key in the secure memory and on the dongle;
   creating a second encryption key by binding an at least one data object with the first encryption key;
   copying a first data segment of the data file and encrypting said first data segment using the first encryption key;
   encrypting the data file using the second encryption key;
   appending the encrypted first data segment to the end of the encrypted data file;
   transmitting the encrypted data file with the appended first data segment to the unsecure environment;
   transmitting the encrypted data fife with the appended first data segment to the secure environment;
   detaching the appended first data segment from the encrypted data file;
   decrypting the first data segment using the first encryption key;
   recreating the second encryption key by binding the at least one data object with the first encryption key;
   decrypting the encrypted data file;
   comparing the decrypted appended first data segment to the decrypted first data segment of the data file; and
   reporting when the first data segment does not match the decrypted first data segment of the data file.

7. A method for secure data protection and updating on a computing device whereby a firmware update is transmitted from a source having a local memory to a secure environment having a secure memory, comprising steps of:

storing a first encryption key in the secure memory and on the local memory of the source;

creating a second encryption key by binding an at least one data object with the first encryption key;

copying a first data segment of the firmware update and encrypting said data segment using the first encryption key;

encrypting the firmware update using the second encryption key;

appending the encrypted first data segment to the end of the encrypted firmware update;

transmitting the encrypted firmware update with the appended first data segment to the secure environment;

detaching the appended first data segment from the encrypted firmware update;

decrypting the first data segment using the first encryption key;

recreating the second encryption key by binding the at least one data object with the first encryption key;

decrypting the encrypted data file;

comparing the decrypted appended first data segment to the decrypted first data segment of the firmware update;

writing the decrypted firmware update into the secure memory when the decrypted appended first data segment matches the decrypted first data segment of the firmware update; and restarting software executable programs on the computing device using the firmware update in the secure memory.

8. A system for secure data protection on a computing device for secure data transmission from a secure environment on the computing device to a peripheral device, the system comprising:

the secure environment on the computing device having a secure memory;

an unsecure environment;

the peripheral device communicatively coupled to the secure environment;

a data file residing in the secure environment, said data file having a front end and a back end;

a dongle communicatively coupling the peripheral device to the unsecure environment for decrypting the data file from the secure environment;

a first encryption key stored in the secure memory on the computing device and on the dongle;

at least one digital object residing on the dongle and in the secure memory;

a fast encrypter communicatively coupled to the secure memory for encrypting the data file, wherein a second encryption key is created by binding the at least one digital object to the first encryption key, then a first data segment of the data tile is copied and encrypted using the first encryption key producing an encrypted first data segment, then the data file is encrypted using the second encryption key, and then the encrypted first data segment is appended to the back end of the data file;

a transmitter communicatively coupled to the secure environment for transmitting encrypted data file with the appended encrypted first data segment to the unsecure environment;

a fast decryptor communicatively coupled to the dongle for decrypting the appended encrypted first data segment using the first encryption key, then recreating the second encryption key by binding the at least one digital object with the first encryption key, and then decrypting the encrypted data file using the second encryption key; and a hardware processor performing steps comparing the decrypted appended first data segment to the decrypted first data segment of the data file, and for reporting when said data segments do not match.

9. A method for secure data protection on a computing device whereby a data file from a secure environment having a secure memory is received by a peripheral device having a dongle, comprising steps of:

storing a first encryption key in the secure memory and on the dongle;

creating a second encryption key by binding an at least one data object with the first encryption key;

copying a first data segment of the data file and encrypting said data segment using the first encryption key;

encrypting the data file using the second encryption key;

appending the encrypted first data segment to the end of the encrypted data file;

transmitting the encrypted data file with the appended first data segment to the unsecure environment;

transmitting the encrypted data file with the appended first data segment to the dongle;

detaching the appended first data segment from the encrypted data file;

decrypting the first data segment using the first encryption key;

recreating the second encryption key by binding the at least one data object with the first encryption key;

decrypting the encrypted data file;

comparing the decrypted appended first data segment to the decrypted first data segment of the data file; and reporting when the first data segment does not match the decrypted first data segment of the data file.

10. The system of claim 1, 3, or 8, wherein the at least one digital object includes at least one of:

a program module;

a program version;

a developer certificate;

a device;

a password; and a custom binding defined by a user.

11. The system of claim 1, 3, or 8 further including a hardware processor for each peripheral device residing in the secure environment performing the step for managing communication into and out of the unsecure environment through to the peripheral device.

12. The system of claim 1, 3, or 8 wherein the dongle includes a non-encrypting mode and acts as a transparent pass-through.

* * * * *